United States Patent [19]
Lubrano et al.

[11] Patent Number: 4,778,733
[45] Date of Patent: Oct. 18, 1988

[54] LOW TOXICITY CORROSION RESISTANT SOLDER

[75] Inventors: Alfonso T. Lubrano, Barrington; Thomas S. Bannos, Cumberland, both of R.I.; Malcolm Warren, Franklin, Mass.; Robert A. Dorvel, Charlestown, R.I.

[73] Assignee: Engelhard Corporation, Menlo Park, N.J.

[21] Appl. No.: 882,050

[22] Filed: Jul. 3, 1986

[51] Int. Cl.⁴ .................. B32B 15/20; C22C 13/00
[52] U.S. Cl. .................................. 428/647; 428/675; 420/560
[58] Field of Search ............... 420/560, 561; 428/606, 428/647, 675; 75/251; 228/56.3, 263.11

[56] References Cited

U.S. PATENT DOCUMENTS

| | | | |
|---|---|---|---|
| 1,239,195 | 4/1917 | Lorenbowicz | 420/560 |
| 1,437,641 | 12/1922 | Ferriere et al. | 420/560 |
| 4,357,162 | 11/1982 | Guan | 420/560 |
| 4,670,217 | 6/1987 | Menson et al. | 420/562 |

FOREIGN PATENT DOCUMENTS

6468 1/1977 Japan .................. 420/561

OTHER PUBLICATIONS

"Somalloy Solder Alloys", Semi-Alloys Technical Bulletin No. SA-64, 1968, 4 pages.
H. Manko, "Solders and Soldering", McGraw-Hill Book Co., N.Y., 1964, pp. 16-25, 179-180, 308-310.
A. D. Merriman, "A Dictionary of Metallurgy", Macdonald & Evans, Ltd., London, 1958, p. 20-Block Tin.
Dowd, J. D. "Solder Fluxes and Techniques for Soldering Aluminum", Symposium on Solder, 59th Annual Meeting of American Society for Testing Materials, Philadelphia, PA, pp. 5-9 (1956) (Exhibit A).
McKeown, J. *The Properties of Soft Solders and Soldered Joints*, British Non-Ferrous Metals Research Association, pp. 14-15 (1948).
Hackh's Chemical Dictionary, "Block Tin".
*Soldering Manual*, 2nd Edition (rev.) (1977), American Welding Society, Inc., Miami, Fla., pp. 3-12.
London, J. et al., "Some Properties of Soldered Joints Made with a Tin/Silver Eutectic Alloy", *Brazing and Soldering*, No. 10, pp. 17-20 (1986).
E. Gebhardt et al, "On the Structure of the Silver/Copper/Tin System", Metallkde, vol. 50 (1959), No. 10, pp. 597-605.
M. E. Warwick, "Plumbing Solders", International Tin Research Institute, Greenford, Middlesex, England, Nov. 1984, 13 pages.

*Primary Examiner*—John J. Zimmerman

[57] ABSTRACT

An article of manufacture, such as is used in plumbing, is formed by soldering copper workpieces together with a lead-free solder having a tin content of from about 92 to 99%, a copper content of from about 0.7 to 6% and a silver content of from about 0.05-3%, by weight.

11 Claims, 4 Drawing Sheets

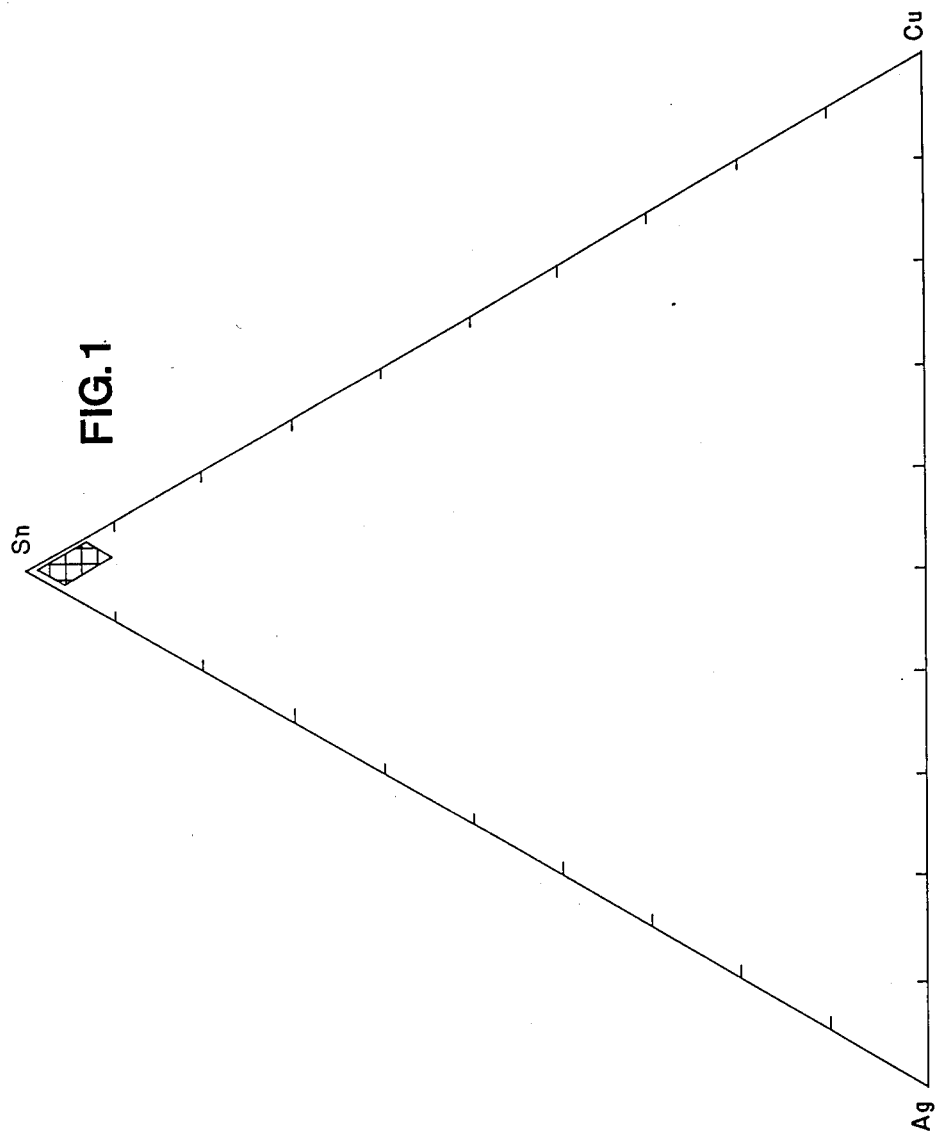

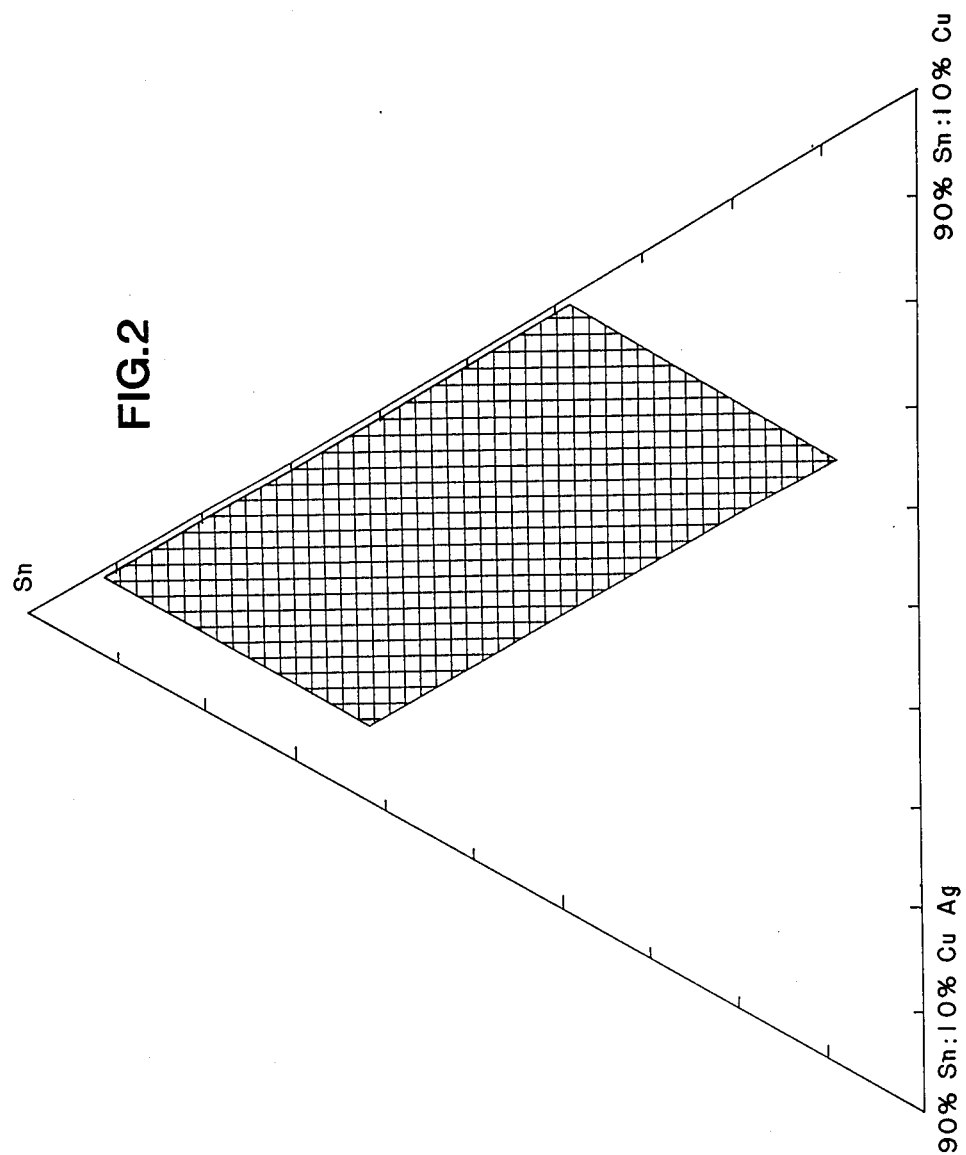

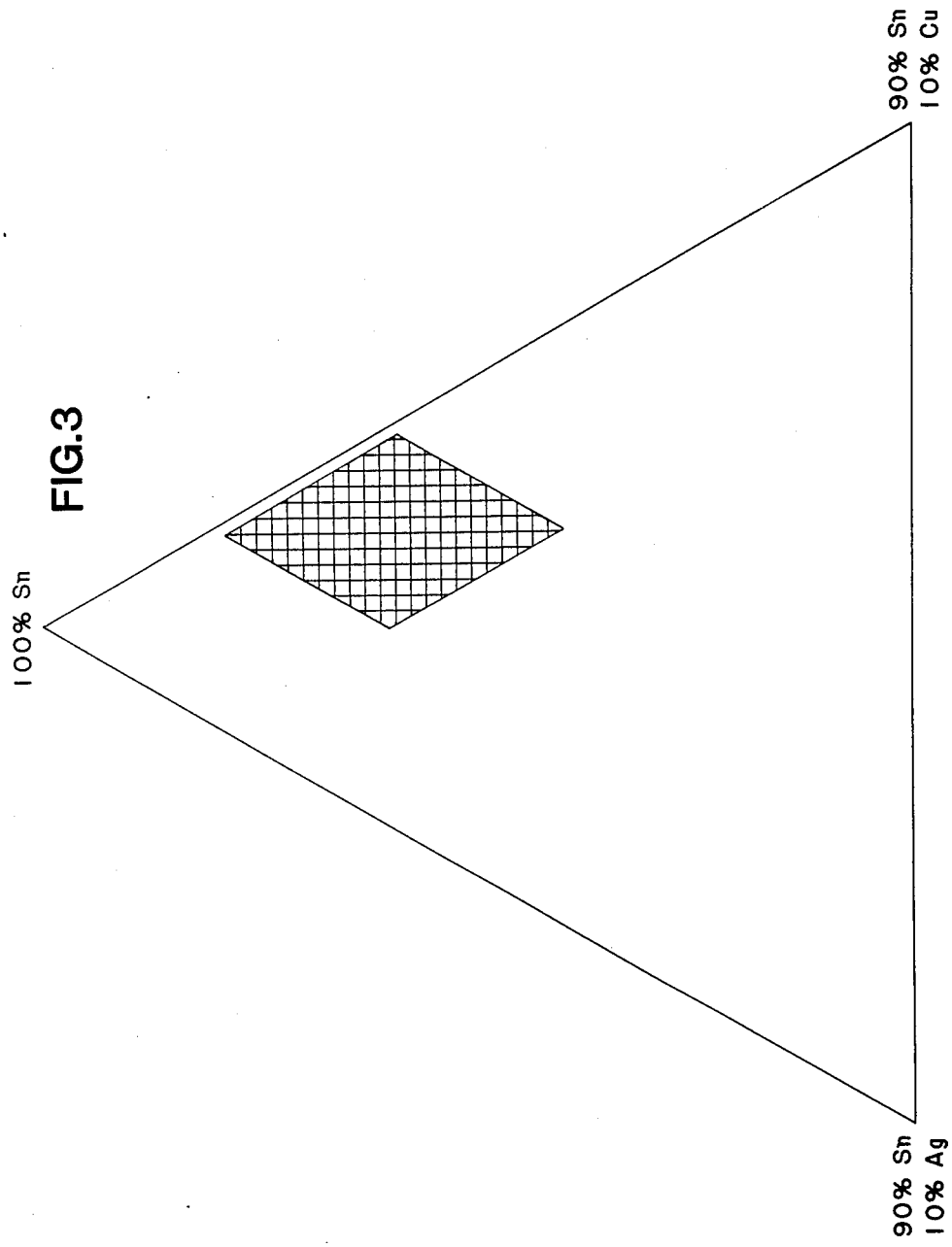

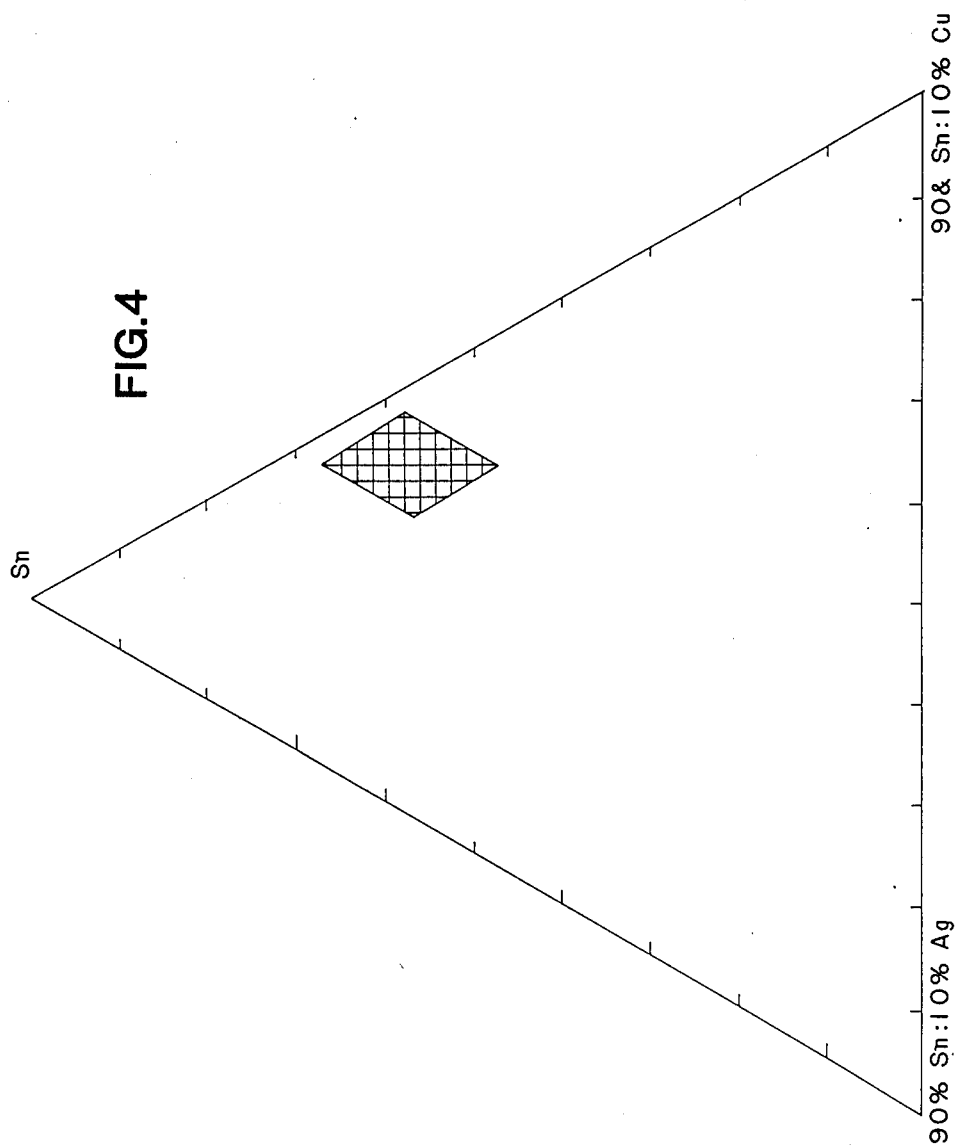

LOW TOXICITY CORROSION RESISTANT SOLDER

Plumbing derives its name from plumbum, the lead used in soldering of pipes, most often in combination with tin. The combination of lead and tin in equal ratios forms an easily used solder which wets copper piping well and is workable over a wide range of temperatures, bridging gaps and forming strong mechanical joints easily. Recently governments have begun to restrict the use of lead in plumbing carrying drinking water based upon the fear that small amounts of lead dissolved in ingested water may have adverse health effects after long periods of time. Plumbers have responded to these restrictions primarily by switching to silver or antimony containing solders or to polyvinyl chloride piping. However, antimony is not only suspect toxicologically but 95%Sn:5%Sb also has a narrow workable range. The silver containing solder most commonly used as a replacement for tin lead solder has been an alloy of tin and from about 4 to 6% silver. This solder has a wide range of workability and can be used by most plumbers who have sufficient skill to properly use lead tin solders. Unfortunately even though silver is the least expensive of the precious metals, it adds significantly to the cost of piping. This invention stems from the discovery that solders which are very comparable to 95%Sn:5%Ag may be formed from alloys of comprising from about 0.05 to about 3% silver, from about 0.7 to about 6% copper and from about 92 to about 99% tin. Preferably, the solder consists essentially of silver, copper and tin, with the content of silver ranging from about 0.05 to about 3%, the content of copper ranging from about 0.7 to about 6%, the balance of the solder being tin. While the tests for performance of solders are necessarily subjective, evaluations of solders of the present invention indicates that these non-toxic solders are essentially comparable in performance to the much more expensive solders containing 95%Sn and 5%Ag, as well as the common, cheap, but possibly toxic lead-tin solder. The solder of the present invention will often be used in the form of a solid deformable body which is easily applied to the parts to be joined or in the form of a paste comprising particles of metal dispersed in a viscous ephemeral vehicle. Among the solid deformable bodies, rods, wires and preforms should be mentioned, preforms being small bodies of solder shaped to closely match one of any of several configurations which are commonly joined. Notable among such preforms are rings, flat annular plates, discs, cups and squares. These solders may also be used in the form of spheres and powders.

U.S. Pat. No. 4,357,162 (Guan) discloses a solder composition comprising (in weight percent) 5 to 8% copper, 20 to 40% silver with the balance being tin. This solder is stated to be advantageous for use in the semiconductor field but obviously the silver content is far too high to be economically practical for use in plumbing applications. As mentioned, solders comprising either 5%Ag:95%Sn or eutectic silver tin (ca. 3.5%Ag:97.5%Sn) are well known. See for example U.S. Pat. No. 3,503,721 (Lupfer).

In U.S. Pat. No. 1,239,195 (Lorentowicz) an alloy is disclosed comprising from one-half to one percent of either or both of silver or copper in "block tin". Haacks Chemical Dictionary defines "block tin" as an alloy of tin with iron, cobalt, lead, antimony and arsenic. The use suggested for this alloy is repairing scored cylinders in internal combustion engines.

U.S. Pat. No. 1,103,482 (Canzier et al) discloses that silver in amounts up to five percent may be included in copper phosporous alloys used for "welding" and that "In place of the silver, cadmium, bismuth or an alloy of any or all of these metals may be employed, the cadmium, silver and alloys, being an equivalent of the silver for purposes of this invention."

U.S. Pat. No. 3,087,813 (Ueno et al) discloses a solder which consists of "1.5 to 3% silver, 72 to 94% tin, 1 to 3% copper, 6 to 9% aluminum, 0.2 to 0.4% silicon, 0.1 to 0.3 indium, 3 to 5% cadmium and small amounts of other metals."

Dental alloys are known having compositions of 8–27% by weight copper, 20–32% tin, balance silver (U.S. Pat. No. 3,871,876); 47–70% silver, 20–32% tin, 7–27% copper; or 55–75% silver, 20–40% tin and 0–10% copper (U.S. Pat. No. 4,234,339) as well as 68–72% silver, 24–28% tin, 1–4% copper; or 55–65% silver, 25–30% tin and 10–15% copper (U.S. Pat. No. 4,453,977).

BRIEF DESCRIPTION OF THE DRAWING

FIG. 1 is a ternary diagram illustrating the locus of compositions of the solders of the present invention.

FIGS. 2, 3 and 4 are the tin rich corners of the ternary diagram of FIG. 1 illustrating preferred compositions of the solders of the present invention.

One useful measure of the ease with which a solder may be used is the melting range, the difference between the liquidus and solidus temperatures as this provides an indication of the range of temperatures (the workable range) over which the solder may be used. The melting range of 50%Sn:50%Pb solder is about 60° F., from 361° F. to 421° F. Through much of this range, lead tin solder forms a paste or "mush" having neither the flowability of a liquid nor the rigidity of a solid so that gaps may be filled, and large fillets formed, by the solids in the solder. As is well known, it is more difficult to precisely define and measure the temperature range over which a "mush" is formed but the "mushy range" more closely corresponds to the workable range, the "mushy range" by definition falling somewhere between the solidus and liquidus temperatures.

The compositions of this invention form high strength joints and form "mushy" compositions throughout much of the lower portion (440°–500° F.) of the extremely wide melting range of from about 440° F. to about 630° F., the effective liquidus point or the exact temperature at which the solder becomes too fluid to work easily being somewhat difficult to measure. The ability of these compositions to wet metals such as copper, iron, nickel, and their useful alloys is quite good.

As shown in FIGS. 1 and 2, solders of the present invention comprise from about 0.7 to 6% copper, from about 0.05 to about 3% silver, the balance being tin. As shown in FIG. 3, a preferred solder of the present invention comprises from about 2 to 4% copper, from about 0.1 to about 2% silver, the balance being tin. FIG. 4 illustrates a more preferred solder of the present invention comprising 0.25 to about 1.25% silver, 3–4% copper, the balance being tin.

Other preferred compositions consisting essentially of tin, copper and silver differ primarily in the silver content, having from about 0.7 to about 6% copper and from about 0.1 to about 3% silver, or from about 0.25 to about 3% silver, or from about 0.1 to about 2% silver, or from about 0.25 to about 1.25%, or from about 0.5 to about 3% silver, or from about 0.5 to about 2% silver or from about 0.5 to about 1.25% silver. It is considered surprising that such small additions of silver can so dramatically improve the properties of copper tin solders in the absence of lead, antimony, arsenic, cobalt, bismuth, thallium, cadmium, mercury, gallium or other toxically suspect metals often used in solders. The solders of the present invention are substantially free of these metals by which we mean that if present at all, these metals are present in such low concentrations that any undue health effects can be expected to be insignificant. For example, most current governmental regulations limiting the use of lead in plumbing solders, specify a lead content of less 0.20%. Thus, for lead, solders having had contents of less that 0.20% can be considered to be "essentially free of lead." For purposes of this invention, no composition having in excess of about 0.20% of any of the named toxically suspect metals should be said to be essentially free of that metal even though much smaller contents may be eventually required to comply with forthcoming governmental regulations.

Small amounts of other non-toxic metals may be present in the grades of metals used for these solders so long as the corrosion resistance and other chemical and mechanical properties are not unduly affected. For example, small amounts of zinc and iron can be tolerated but larger amounts can severely degrade the corrosion resistance of the solder.

For many applications, a soft solder of the present invention is most conveniently formed into wires, rods, coils or similar deformable bodies which may be stored in a compact form then extended and fed against the heated workpieces which are to be joined. For other applications, similar shapes will be used but the wire or rod will have a hollow core filled with flux. Any convenient flux may be used, including corrosive, neutral and non-corrosive fluxes. The corrosive fluxes are quite useful when metals which are to be joined are coated with an oxide film or crust. Chlorides of zinc, ammonium, calcium, magnesium and many metals are quite commonly used as fluxes. Stearic acid and analogous compounds are commonly used as so called neutral fluxes, while rosin is a common non-corrosive flux. Typical fluxes are disclosed in U.S. Pat. Nos. 2,299,168; 2,430,110; 2,493,372; 2,507,346; 2,552,105; 2,914,435 and 3,149,007.

The solders of the present invention may also be used as pastes or creams wherein suitably sized particles of metal and possibly flux are dispersed in a suitable viscous ephemeral carrier. The metal may be present as particles of alloy, the separate metals in the appropriate ratios or a mixture of the two so long as the overall average composition falls within the ranges of the present invention. The principal qualifications for a carrier is that it is viscous enough to suspend the metal particles, flowable enough to allow the solder to be applied and ephemeral by which we mean that upon heating, the carrier is easily removed from the joint or workpiece to be soldered such as by evaporation, combustion, decomposition or a combination of methods especially in the case of carriers consisting of a mixture of components.

The preferred carriers have a high viscosity and are able to maintain the other components of the paste in suspension or dispersion over long periods of time even at relatively elevated temperatures (up to about 130° F.) such as might be found in plumber's trucks standing in the hot sun, viscosities of about 50 to about 300 poise being preferred. Preferably the viscosity of the carrier should not change so significantly with temperature as to permit significant settling or separation of the other components until after application to the surfaces to be brazed. Most carriers will be a mixture of compounds including polyethylene oxide polymers, polyacrylate polymer, polymethylmethacrylate polymers, polyacrylonitrile polymers, olefins and olefinic copolymers, polyethylene glycols and methyl others thereof. For further details on fluxes and carriers, see U.S. Pat. No. 4,151,016 or British Pat. No. 1,590,695. More rigid flux carrying pastes intended for use in brazing but which also may find use in the solders of the present invention are disclosed in British published application GB No. 2,004,489A.

EXAMPLE I

To illustrate the excellent properties of solders of the present invention as compared to prior art solders, a series of solders were prepared, and tested for wire pull strength and lap shear strength as set forth in Table I.

TABLE I

| Alloy | (Wt. %) | | | | | Wire Tensile (PSI) | Pounds to Breakage (lap joint) |
|---|---|---|---|---|---|---|---|
| | Sn | Cu | Ag | Sb | Pb | | |
| 1 | 50 | — | — | — | 50 | 4,675 | 3,200 |
| 2 | 95 | — | — | 5 | — | 7,537 | 3,090 |
| 3 | 96 | — | 4 | — | — | 6,044 | 3,550 |
| 4 | 95 | 5 | — | — | — | 5,786 | No Results |
| 5 | 95.65 | 4 | 0.35 | — | — | 6,060 | 3,830 |

This example illustrates that the alloy 5 of the present invention is comparable in strength to 50%Sn:50%Pb solder 1, 95%Sn:5%Sb solder 2, 96%Sn:4%Ag solder 3, and 95%Sn:5%Cu solder 4.

EXAMPLE II

To illustrate the melting range of the solder of the present invention, a series of solder compositions were prepared as set out in Table II which also sets forth the actual solidus and liquidus temperatures measured for thee compositions.

TABLE II

| Alloy | Wt. % | | | | | Solidus (°F.) | Liquidus (°F.) |
|---|---|---|---|---|---|---|---|
| | Sn | Cu | Ag | Sb | Pb | | |
| 1 | 50 | — | — | — | 50 | 365 | 420 |
| 2 | 95 | — | — | 5 | — | 455 | 470 |
| 3 | 96 | — | 4 | — | — | 433 | 433 |
| 4 | 98 | 2 | — | — | — | 440 | 507 |
| 5 | 96.75 | 2 | 1.25 | — | — | 435 | 500 |
| 6 | 96.5 | 3 | 0.5 | — | — | 438 | 575 |
| 7 | 96 | 4 | — | — | — | 440 | 640 |
| 8 | 95.65 | 4 | 0.35 | — | — | 440 | 630 |
| 9 | 95.5 | 4 | 0.5 | — | — | 440 | 627 |
| 10 | 94.75 | 4 | 1.25 | — | — | 433 | 625 |

This illustrates that the solders of the present invention (5,6,8,9 and 10) melt over temperature ranges which are very comparable to those of prior art solder. It should be understood that even though Table 2 indicates that additions of silver decrease the actual liquidus temperature slightly, in practice, addition of silver increases the effective liquidus temperature as it expands the workable range, i.e., the range over which the composition remains "mushy" increases.

EXAMPLE III

To more fully illustrate this present invention, a series of solders were prepared. As a comparison, the first solder prepared comprised 95%Sn:5%Cu. When tested for soldering in wire form the performance was only borderline acceptable, the wire tended to stick to the copper workpiece, the fillets formed were poor and the solder did not wet the workpieces well. In contrast, a solder of the present invention comprising 4.75%Cu, 0.25%Ag, balance tin did not exhibit the sticking problem and wet the workpieces better than the 95%Sn:5%Cu solder. Another solder of the present invention comprising 4.5%Cu, 0.5%Ag, balance Sn was quite good as a solder, neither sticking nor dripping but forming good fillets and wetting the workpiece well. Still another solder of the present invention comprising 3%Ag:3%Cu, balance tin was evaluated as excellent as a solder, wetting, bridging and filleting well without sticking or dripping.

As our invention, we claim:

1. A new and useful article of manufacture, comprising:
    a first copper or copper alloy member,
    a second copper or copper alloy member positioned closely adjacent said first copper or copper alloy member, and
    adherent bonding means joining said first and second copper or copper alloy members,
    said adherent bonding means including a low toxicity, corrosion resistant solder alloy consisting essentially of from about 0.7 to about 6% by weight of copper, from about 0.05 to about 3% by weight of silver and the balance being tin, said solder alloy further being essentially free of lead and arsenic.

2. The article as claimed in claim 1 wherein said first and second copper or copper alloy members are positioned so that said adherent bonding means forms a lap joint therebetween.

3. The article as claimed in claim 1, wherein said solder alloy further is essentially free of antimony, cobalt, bismuth, thallium, cadmium, mercury and gallium.

4. The article as claimed in claim 1, wherein the silver content of said solder alloy is from about 0.25 to about 1.25% by weight, the copper content is from about 2 to about 4% by weight and the tin content is from about 97.75 to about 94.75% by weight.

5. The article as claimed in claim 1, wherein the maximum silver content of said solder alloy is less than 0.5% by weight.

6. The article as claimed in claim 2, wherein said first and second copper or copper alloy members comprise copper or copper alloy piping.

7. The article as claimed in claim 5, wherein the copper content of said solder alloy is from about 4 to about 5% by weight.

8. A new and useful article of manufacture, comprising:
    a first copper or copper alloy piping member,
    a second copper or copper alloy piping member positioned closely adjacent and in overlapping relationship to said first copper or copper alloy piping member, and
    adherent bonding means forming a lap joint between said first and second copper or copper alloy piping members, said adherent bonding means including a low toxicity, corrosion resistant solder alloy consisting of from about 0.7 to about 6% by weight of copper, from about 0.05 to about 3% by weight of silver and the balance being tin which is essentially free of lead, arsenic, antimony, cobalt, bismuth, thallium, cadmium, mercury and gallium.

9. The article as claimed in claim 8, wherein the silver content of said solder alloy is from about 0.25 to about 1.25% by weight and the copper content is from about 2 to about 4% by weight.

10. The article as claimed in claim 8, wherein the maximum silver content of said solder alloy is less than 0.5% by weight.

11. The article as claimed in claim 10, wherein the copper content of said solder alloy is from about 4 to about 5% by weight.

* * * * *